(12) United States Patent
Apostoloiu et al.

(10) Patent No.: US 8,914,679 B2
(45) Date of Patent: Dec. 16, 2014

(54) SOFTWARE TESTING AUTOMATION FRAMEWORK

(75) Inventors: Laura I. Apostoloiu, Markham (CA); Xin Chen, Arcadia, CA (US); R. Scott Harvey, Cedar Valley (CA); Young Wook Lee, North York (CA); Kyle Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 11/363,725

(22) Filed: Feb. 28, 2006

(65) Prior Publication Data

US 2007/0220341 A1    Sep. 20, 2007

(51) Int. Cl.
*G06F 11/00* (2006.01)
*G06F 11/36* (2006.01)

(52) U.S. Cl.
CPC ........ *G06F 11/3684* (2013.01); *G06F 11/3664* (2013.01)
USPC .......................................................... 714/38

(58) Field of Classification Search
USPC .......................................................... 714/38
See application file for complete search history.

(56) References Cited

U.S. PATENT DOCUMENTS

| | | | |
|---|---|---|---|
| 6,002,869 A | 12/1999 | Hinckley | |
| 6,163,805 A | 12/2000 | Silva et al. | |
| 6,715,108 B1 * | 3/2004 | Badger et al. | 714/38.1 |
| 6,859,922 B1 * | 2/2005 | Baker et al. | 717/125 |
| 7,353,472 B2 * | 4/2008 | DeMaris et al. | 716/51 |
| 7,676,292 B2 * | 3/2010 | Weatherhead et al. | 700/97 |
| 8,359,581 B2 * | 1/2013 | Ortiz | 717/128 |
| 2005/0120276 A1 | 6/2005 | Kolawa et al. | |
| 2005/0144529 A1 | 6/2005 | Gotz et al. | |
| 2006/0242466 A1 * | 10/2006 | Tillmann et al. | 714/38 |
| 2007/0168734 A1 * | 7/2007 | Vasile | 714/33 |
| 2007/0220341 A1 * | 9/2007 | Apostoloiu et al. | 714/33 |
| 2008/0320071 A1 * | 12/2008 | Hoskins et al. | 709/202 |
| 2009/0249297 A1 * | 10/2009 | Doshi et al. | 717/124 |
| 2010/0146489 A1 * | 6/2010 | Ortiz | 717/128 |
| 2011/0016453 A1 * | 1/2011 | Grechanik et al. | 717/125 |
| 2011/0258600 A1 * | 10/2011 | Osenkov et al. | 717/124 |
| 2012/0016621 A1 * | 1/2012 | Tan et al. | 702/122 |

FOREIGN PATENT DOCUMENTS

EP            1577760 A3    9/2005

* cited by examiner

*Primary Examiner* — Amine Riad
(74) *Attorney, Agent, or Firm* — Steven M. Greenberg, Esq.; CRGO Law

(57) ABSTRACT

Embodiments of the present invention address deficiencies of the art in respect to software test automation and provide a method, system and apparatus for a reusable software testing framework. In one embodiment of the invention, an automated application test data processing system can include a reusable test automation framework. The system further can include a test task generator and a scenario generator coupled to one another and to the framework. In this regard, the test task generator can be configured to generate uniform logic for performing testing tasks, while the scenario generator can be configured to arrange testing tasks for a complete test scenario. Finally, a collaborative testing environment can be provided through which multiple users can interact with the scenario generator and test task generator to produce test cases of different test scenarios.

18 Claims, 4 Drawing Sheets

SOFTWARE TESTING AUTOMATION FRAMEWORK

BACKGROUND OF THE INVENTION

1. Field of the Invention

The present invention relates to the field of software testing and more particularly to automated software testing.

2. Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art.

Often, to test an application, testing personnel must establish and configure a testing environment. Within the testing environment, a test protocol can be defined for exercising a computing application. The individual steps and portions of the testing protocol, in turn, can be automated through operating system scripts, batch files and the like. In this regard, for a test protocol, a typical test cycle can include multiple phases that test a system from various angles, such as functional, performance, and system test phases.

Importantly, due to differences in testing approach and goal, each test phase can include a separate automation design and implementation; thus, making reusability among the phases very difficult, if not impossible. Even within the same phase of testing, reusability is not always achievable due to the complexity of the tests. In this regard, if multiple tests use the same operational procedures, the multiple tests can require different types of input parameters and produce different output. Finally, usually more than one person or team can be engaged in test automation, leading to near parallel automation solutions that do not enable testers to contribute to and share from a common pool of automation assets. As such, the process of test automation can be redundant and inefficient.

BRIEF SUMMARY OF THE INVENTION

Embodiments of the present invention address deficiencies of the art in respect to software test automation and provide a novel and non-obvious method, system and apparatus for a reusable software testing framework. The re-usable test automation framework can include a general functions layer, a tasks layer, a scenarios layer and a test cases layer. The general functions layer can include a general function library including administrative framework functions and non-application related functions. Exemplary functions disposed within the general functions layer include file input/output (I/O) functions and database query functions. The tasks layer can include a task library including granular, single purposed application related functions, each function conforming to a uniform, base interface to ensure re-usability. Exemplary tasks disposed within the tasks layer include application logon and logoff functions, and application object creation, modification and deletion functions.

The scenarios layer can include a library of test flows, each test flow arranged from an ordered selection of tasks in the tasks layer. For example, in a test flow for an e-commerce application, a test flow for a create product scenario can include the ordered combination of an application specific logon function, an application specific create product function, and an application specific logoff function. Finally, the test cases layer can include a test case library wherein each test case can include an ordered arrangement of one or more scenarios and supplemental test data. For example, in the example pertaining to an e-commerce application, a test case can include a create product scenario in addition to specific product data for use when creating a product using the create product scenario.

In one embodiment of the invention, an automated application test data processing system can include a reusable test automation framework. The system further can include a test task generator and a scenario generator coupled to one another and to the framework. In this regard, the test task generator can be configured to generate uniform logic for performing testing tasks, while the scenario generator can be configured to arrange testing tasks for a complete test scenario. Finally, a collaborative testing environment can be provided through which multiple users can interact with the scenario generator and test task generator to produce test cases of different test scenarios.

Notably, the reusable test automation framework can include a general functions layer including a general functions library, a tasks layer including tasks, and a scenarios layer including test flows, each test flow including an ordered assembly of selected ones of the tasks in the tasks layer. The framework also can include a test cases layer including test cases, each test case including at least one test scenario from the scenarios layer. The general functions library further can include one or more non-application functions utilized within at least one of the tasks in the tasks layer. The tasks, by comparison, each can include an assembly of granular, single purposed application related functions. In this regard, each of the granular, single purposed application related functions can conform to a uniform base interface.

In another embodiment of the invention, a test case assembly method for testing an application can include defining multiple tasks, each task ordering a selection of granular, single purposed application related functions, and further defining multiple test scenarios, each scenario ordering a selection of the defined tasks in a test flow. The method further can include selecting at least one of the defined test scenarios in a test case. Finally, the test case can be provided to a test automation controller for testing the application in a target testing environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a reusable test automation framework. In accordance with an embodiment of the present invention, a reusable test automation framework can be incorporated in a test automation system. The reusable test automation framework can include a layer of pre-defined general computing functions. One or more testing tasks can be assembled through an arrangement of selected ones of the pre-defined general computing functions, and one or more testing scenarios can be assembled through an arrangement of selected ones of the testing tasks. Finally, one or more test cases can be assembled through an arrangement of selected ones of the scenarios. In this way, a high degree of reusability can be provided through a re-arrangement of any one of the pre-defined general computing functions, tasks or scenarios to assemble a different test case.

Importantly, a test scenario generator and a test task generator can be provided to automate the process of creating and validating scenarios and test tasks included in the scenarios. In particular, the test task generator can accept minimally required input to specify a test task and can produce a test task that conforms to a common interface for test tasks in the test automation framework. Consequently, the produced test tasks can be incorporated by multiple different users in multiple different test scenarios for multiple different test cases thereby ensuring a high degree of reusability for the generated test tasks.

Figure 1:
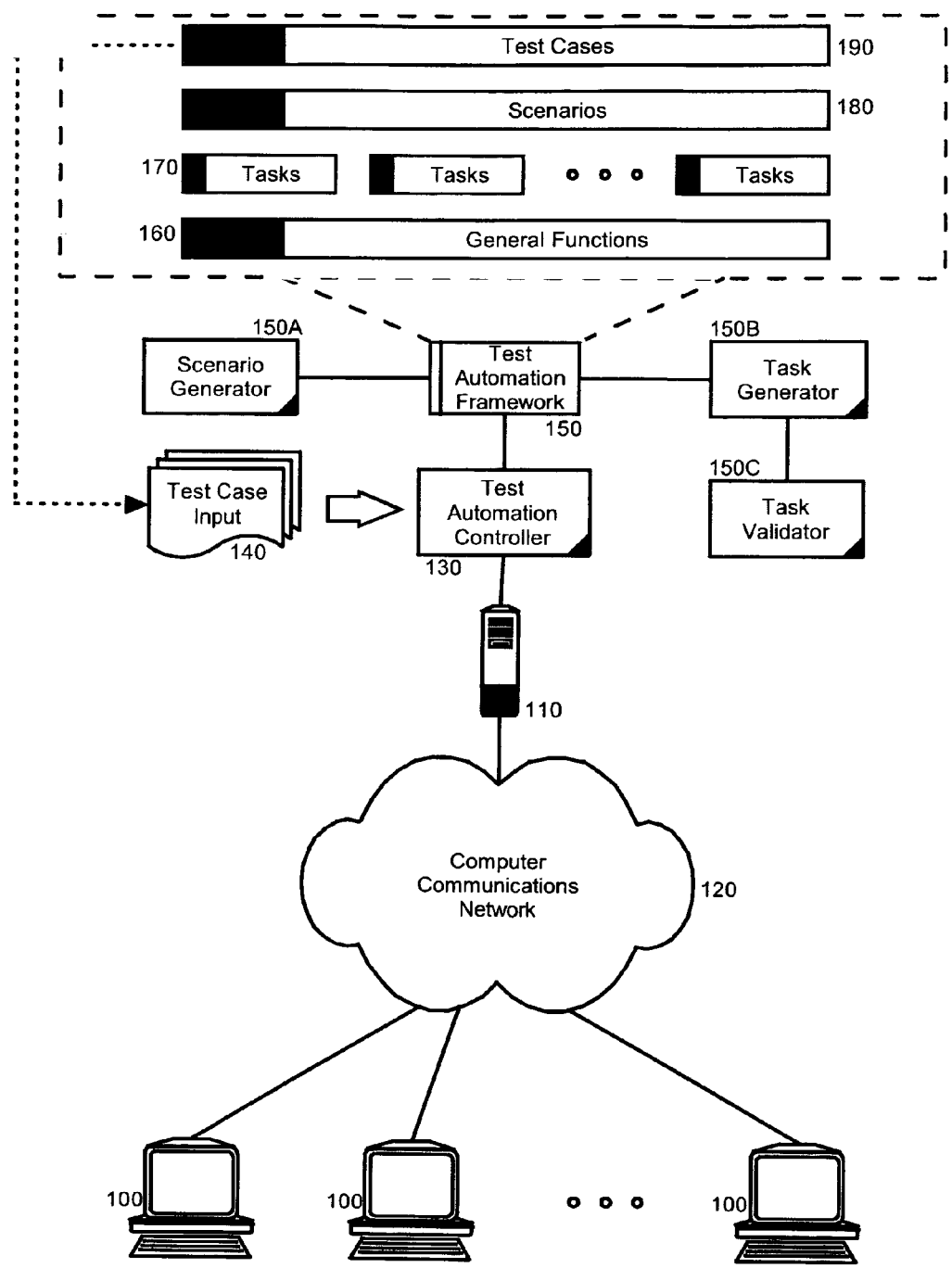
FIG. 1 is a schematic illustration of a data processing system incorporating a reusable testing automation framework.

In illustration, FIG. 1 is a schematic illustration of a data processing system incorporating a reusable testing automation framework. The data processing system can include an automated test system 110 configured for communicative coupling to one or more target host computing platforms 100 over a computer communications network 120. The automated test system 110 can include a test automation controller 130 responsible for processing test cases in an automated testing process. The test automation controller 130, in turn, can define an interface for accessing a reusable test automation framework 150.

Importantly, the re-usable test automation framework can include a general functions layer 160, a tasks layer 170, a scenarios layer 180 and a test cases layer 190. The general functions layer 160 can include a general function library including administrative framework functions and non-application related functions. Exemplary functions disposed within the general functions layer 160 include file input/output (I/O) functions and database query functions. The tasks layer 170 can include a task library including granular, single purposed application related functions, each function conforming to a uniform, base interface to ensure re-usability. Exemplary tasks disposed within the tasks layer 170 include application logon and logoff tasks, and application object creation, modification and deletion tasks.

The scenarios layer 180 can include a library of test flows, each test flow arranged from an ordered selection of tasks in the tasks layer 170. For example, in a test flow for an e-commerce application, a test flow for a create product scenario can include the ordered combination of an application specific logon function, an application specific create product function, and an application specific logoff function. Finally, the test cases layer 190 can include a test case library wherein each test case can include an ordered arrangement of one or more scenarios and supplemental test data. For example, in the example pertaining to an e-commerce application, a test case can include a create product scenario in addition to specific product data for use when creating a product using the create product scenario.

The test automation controller 130 can include test automation logic including program code enabled to process test case input 140. The test case input 140 can be produced from test cases assembled within the test cases layer 190. Utilizing the test case documents, the program code can be enabled to establish and manage a testing environment in designated individual ones of the target host computing platforms 100 and to dispatch the execution of tests within the configured environments of individual designated ones of the target host computing platforms 100.

Notably, a scenario generator 150A can be coupled to the test automation framework 150. The scenario generator 150A can include program code enabled to automate the generation of testing scenarios based upon user specified parameters. The generated testing scenarios can conform to a common interface for scenarios in the scenario layer 180 of the test automation framework 150. Each of the scenarios produced by the scenario generator 150A can include an arrangement of testing tasks. To that end, a task generator 150B can include program code enabled to automate the generation of testing tasks based upon user specified parameters. The generated testing tasks can conform to a common interface for scenarios in the tasks layer 170 of the test automation framework 150. Finally, a task validator 150C can be provided. The task validator 150C can validate generated testing tasks to ensure compliance with the common interface for the testing tasks of the tasks layer 170 of the test automation framework 150.

Figure 2:
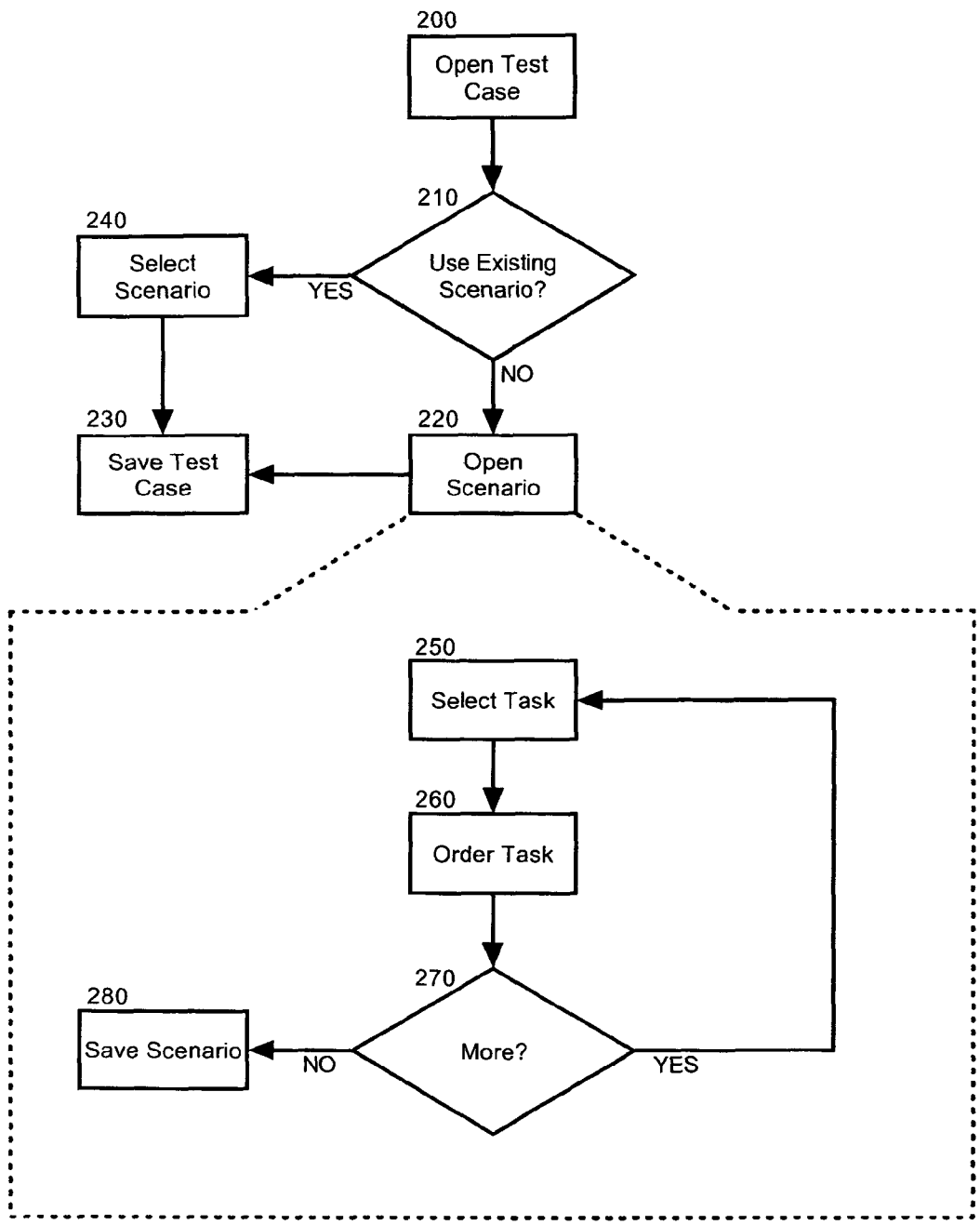
FIG. 2 is a flow chart illustrating a process for constructing a test case in the reusable testing automation framework of FIG. 1.

In further illustration, FIG. 2 is a flow chart illustrating a process for constructing a test case in the reusable testing automation framework of FIG. 1. Beginning in block 200, a test case can be established within the framework. In block 210, it can be determined whether or not to incorporate an existing scenario in the test case. If it is determined to incorporate an existing scenario, in block 240, the existing scenario in the framework can be selected and the test case can be saved in block 230 for subsequent retrieval. Otherwise, a new scenario can be assembled in block 220 and the test case can be saved in block 230.

More specifically, when assembling a new scenario, in block 250 a first task in the framework can be selected and block 260, the selected task can be ordered to achieve a desired test flow. It is to be recognized that tasks can be created for assembly and ordering in the scenario through a selection of one or more functions in a general library. In decision block 270, if additional tasks are to be ordered in the desired test flow, the process can repeat through block 250. When no further tasks are to be incorporated in the scenario, however, in block 280, the scenario can be saved for use in a test case.

Figure 3:
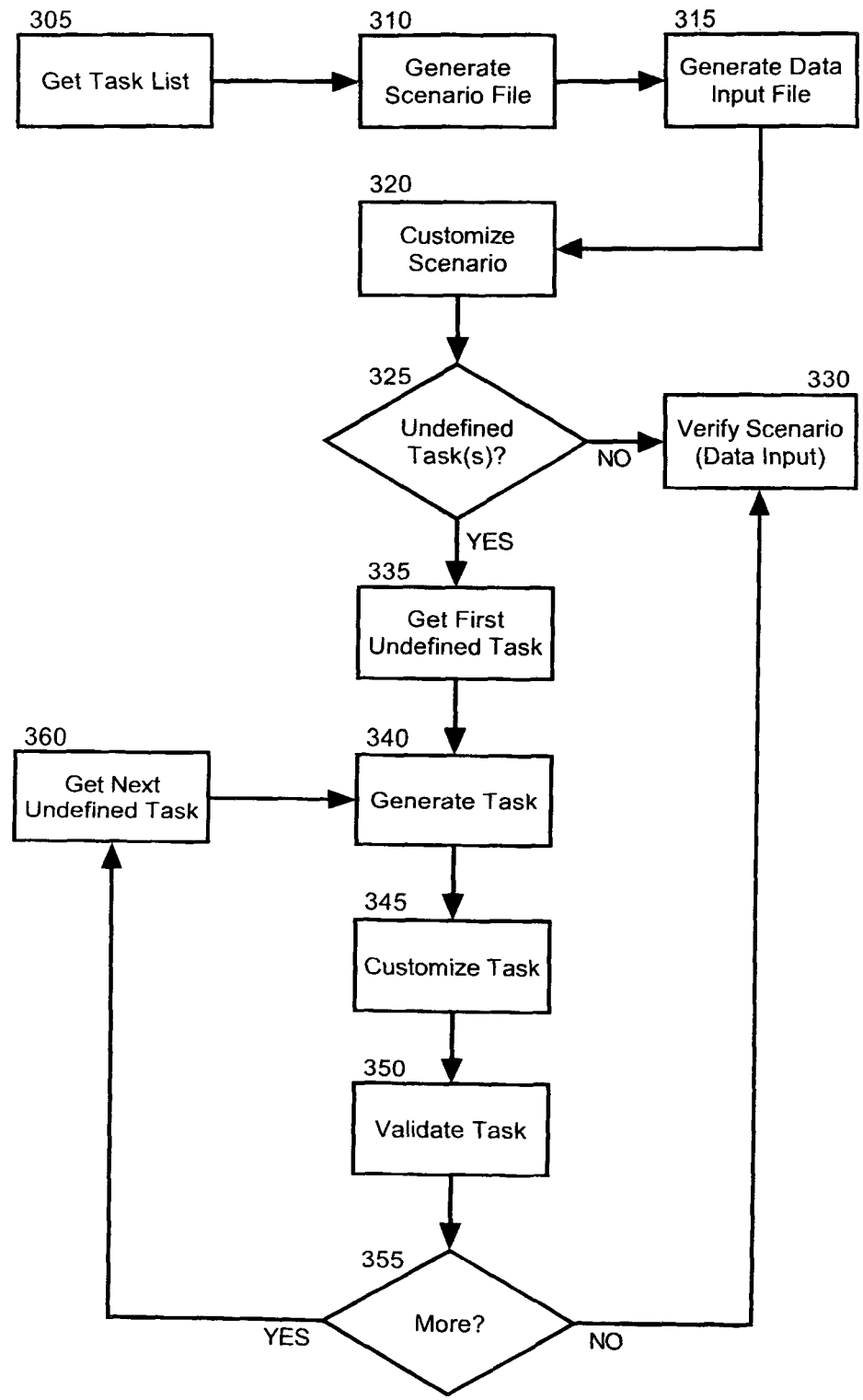
FIG. 3 is a flow chart illustrating a process for generating scenarios for inclusion in a test case and test tasks for inclusion in a scenario; and, FIG. 4 is a flow chart illustrating a process for collaboratively establishing test tasks in the testing automation framework of FIG. 1.

Importantly, the generation of scenarios and tasks can be automated in order to ensure that the scenarios and tasks conform to a common interface for the test automation framework. To that end, a scenario generator can be coupled to a task generator which in turn can be coupled to a task validator. In yet further illustration of the operation of these three components, FIG. 3 is a flow chart illustrating a process for generating scenarios for inclusion in a test case and test tasks for inclusion in a scenario. Beginning in block 305, a task list can be retrieved for a scenario and in block 310, a scenario file can be generated according to user input provided for the scenario. The user input can include, by way of example, a name and purpose.

In block 315, a data input file can be created for verifying the integrity of the scenario through the use of pre-defined user input and in block 320, the generated scenario can be manually customized by the end user through the editing of the code of the generated scenario. In decision block 325, it can be determined whether any of the tasks included in the scenario have not yet been defined. If all tasks have been defined, in block 330 the scenario can be verified using the data input file. Otherwise, the process can continue through block 335.

In block 335, a first undefined task for the scenario can be selected for generation and in block 340, a task can be generated based upon user provided input. The user provided input can include, by way of example, a name, purpose, entry point, exit point, input and output. The generated task can include task source code accounting for the user provided input that conforms to the common interface for tasks in the test automation framework. Notwithstanding, in block 345, an end user can apply manual edits to the source code of the generated task. A Silk™ based example follows (Silk is a Registered Trademark of Segue Software, Inc. of Lexington, Mass., United States):

User Input to the Task Generator:
<Task>
Name: Logon
Purpose: Logon a registered user to a store
Entry Point: Store logon page
Exit Point: Store front page
Input: logonId, logonPassword
Output: logonStatus
The Task Generator generates the following task code in which the task name is the command called by the general function, "WebHit". This general function is used to call a web command. The input specified above match with the parameters required for this web command.

```
//------------------------------------------------------------------
// Implemented by   : !!!YOUR NAME!!! on !!!DATE!!!
//
// Defined by       : John Q. Public
//
// Last modified by:
//
//------------------------------------------------------------------
/*******************************************************************
    @ Task Name     : Logon
    @ Purpose       : Logon a registered user to a store
    @ Entry Point   : Store logon page
    @ Exit Point    : Store front page
    @ Input         : logonId
                      logonPassword
    @ Output        : logonStatus
    @ Comments      :
*******************************************************************/
var
            ///////////// Task Counter          /////////////
            counter : number;
            ///////////// Task Input Variables  /////////////
            logonId : string;
            logonPassword : string;
            ///////////// Task Output Variables /////////////
            logonStatus : string;
function Logon
    begin
        CurrentFileName := "Logon.bdh";
        Debugging ("////////// Entering Logon //////////");
        counter := counter + 1;
        ////////// Set Input //////////
        logonId:= GetInput( );
        logonPassword := GetInput( );
        // Pass a parameter only if it is assigned some value.
        if (logonId <> NO_INPUT_DEFINED) then
            WebFormValuePairInsert(FORM_Logon, "logonId", logonId);
        end;
        if (logonPassword <> NO_INPUT_DEFINED) then
            WebFormValuePairInsert(FORM_Logon, "logonPassword",
logonPassword);
        end;
        Debugging ("logonId is " + logonId);
        Debugging ("logonPassword is " + logonPassword);
WebHit("Logon",WAIT_TIME,"Logon","/webapp/wcs/stores/servlet/",WEB_FORM_POST,FORM_Logon);
```

```
        loginStatus := !!!!! PUT PROPER VALUE HERE!!!!!
    end Logon;
dclform
        FORM_Logon:
            "" := "";
```

As it will be recognized by the skilled artisan, the generated code requires little manual intervention other than providing a value for the "loginStatus" parameter. Once the end user has manually applied a value for this parameter, both the input and output of the task are in place and error-handling is included in the WebHit command. Specifically, when errors are detected in returned pages, the error handler automatically flags the detected errors. As it will be further recognized by the skilled artisan, the automated generation of test code can conserve an enormous amount of time and can ensure that the generated code always conforms to the common interface of the test automation framework making reusability trouble-free. Finally, it will be understood that the test task generator can adapt to many different testing platforms merely by changing the mapping of the user input to the commands of the generated source code.

Returning now to FIG. 3, in block 350, the generated task can be validated to ensure conformance with the common interface of the test automation framework. Subsequently, in decision block 355, if additional tasks remain to be defined for the scenario, in block 360 a next undefined task can be selected for task generation and the process can repeat through block 340. In decision block 355, when no further tasks remain to be defined for the scenario, in block 330, the scenario can be verified using the data from the data input file.

Figure 4:
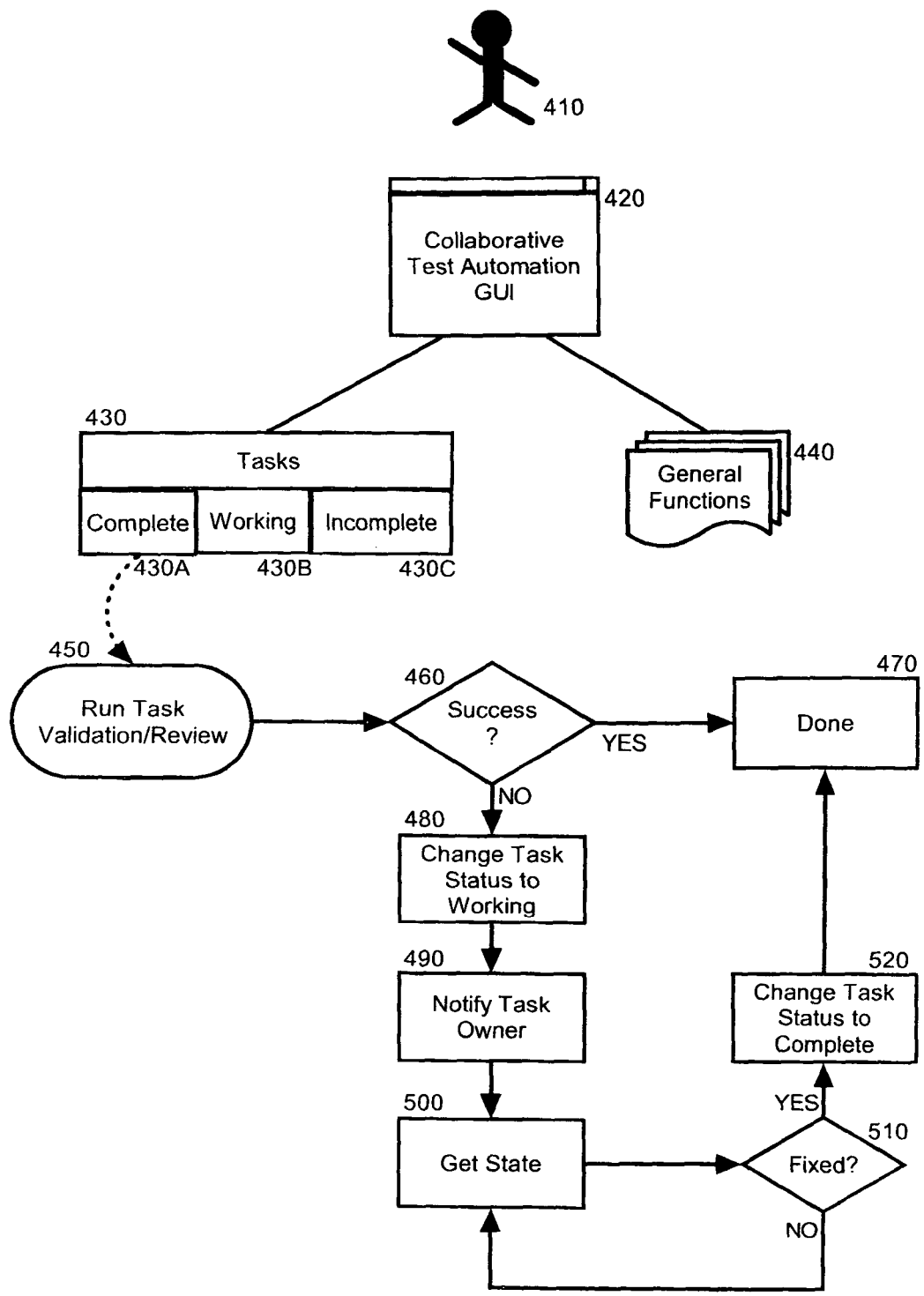

In accordance with an embodiment of the present invention, the test automation framework can be utilized collaboratively among multiple different test teams in order to achieve a high degree of usability. In illustration, FIG. 4 is a flow chart illustrating a process for collaboratively establishing test scenarios in the testing automation framework of FIG. 1. As shown in FIG. 4, a test team 410 can interact with the test automation framework to create tasks 430 through a collaborative test automation graphical user interface 420.

Each of the tasks 430 can include a status attribute 430A, 430B, 430C indicating whether or not the task is able to be incorporated into a scenario generated for the test team 410. For example, the attributes can include a complete attribute 430A, a working attribute 430B and an incomplete attribute 430C. Once a task has been generated, in block 450, the task can be validated and reviewed by the test team 410. Specifically, the validation can be performed separately by an administrative team and the testing team. The testing team can validate in respect to the creation and management of the task specifically, whereas the administrative team can validate in respect to the interoperability of the task in the context of a larger scenario. Optionally, the validation can be performed in an automated fashion, periodically executing independently of the task and scenario generation process. In any event, in decision block 460, if the validation is a success, in block 470 the process can end and the complete attribute 430A can be assigned to the task. Otherwise, the process can continue through block 480.

In decision block 460, if the validation is not considered to have been a success, in block 480 the working attribute 430B can be assigned to the task and in block 490, the user administratively responsible for the task can be notified of the failure. Thereafter, it is expected that the user will correct the task and in block 500, the state of the task can be checked to determine whether or not the task has been repaired. In decision block 510, if the task has been repaired, in block 520 the complete attribute 430A once again can be assigned to the task and the process can end in block 470.

In accordance with another embodiment of the present invention, the test automation framework can be provided as an on-demand service to multiple different test teams in order to achieve a high degree of usability on an on-demand basis. When provided as an on-demand service, the test automation framework can be stored on a shared file system accessible from one or more servers having resources that can scale according to workload demands placed upon the servers. End users can interact with the test automation framework via transactions that contain data and server processing requests. Different requests from different end users can be differentiated through identifying parameters incorporated within the requests. Optionally, each of the different end users can be assessed a fee on a per transaction or per use basis when utilizing the test automation framework to process test cases in testing an application.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An automated application test data processing system comprising:
    a reusable test automation framework comprising separable general functions, testing tasks, testing scenarios of the testing tasks and general functions, and test cases of the testing scenarios stored in a test case library, each test case in the library including an ordered arrangement of one or more scenarios and supplemental test data, each of the scenarios ordering a selection of the testing tasks in a test flow;
    a testing scenario generator coupled to the test automation framework and configured to produce the testing scenarios from an assembly of the testing tasks and general functions by automating the generation of testing tasks based upon user specified parameters the tasks conforming to a common interface for scenarios in a tasks layer and scenario layer of the test automation framework;
    a task generator coupled to the testing scenario generator and configured to produce the testing tasks; and,
    a test automation controller for testing the application in a target testing environment by applying the test case to the application. providing the test case to a test automation controller for testing the application in a target testing environment.

2. The system of claim 1, wherein the reusable test automation framework comprises:
    a general functions layer comprising a general functions library comprising the general functions;
    a tasks layer comprising the testing tasks;
    a scenarios layer comprising test flows, each test flow comprising an ordered assembly of selected ones of the testing tasks in the tasks layer; and,
    a test cases layer comprising test cases, each test case comprising at least one test scenario from the scenarios layer.

3. The system of claim 1, wherein the general functions comprise a plurality of non-application functions utilized within at least one of the tasks in the tasks layer.

4. The system of claim 3, wherein the testing tasks each comprises an assembly of granular, single purposed application related functions.

5. The system of claim 4, wherein each of the granular, single purposed application related functions conform to a uniform base interface.

6. The system of claim 1, further comprising a task validator.

7. The system of claim 1, further comprising a collaborative test automation graphical user interface configured to provide access to the reusable testing tasks of the test automation framework.

8. The system of claim 7, wherein each of the testing tasks comprise an attribute selected from the group consisting of complete, working and incomplete.

9. A test case assembly method for testing an application, the method comprising:
    defining by a task generator based upon user specified parameters, a plurality of tasks, each task ordering a selection of granular, single purposed application related functions, the defined tasks conforming to a common interface for test scenarios in a tasks layer and scenario layer of a test automation framework;
    further defining a plurality of test scenarios, each scenario ordering a selection of the defined tasks in a test flow;
    selecting at least one of the defined test scenarios in a test case;
    storing the test case in a library of test cases each test case including an ordered arrangement of one or more scenarios and supplemental test data; and,
    providing the test case to a test automation controller for testing the application in a target testing environment.

10. The method of claim 9, wherein defining a plurality of tasks comprises defining a plurality of tasks, each task ordering a selection of granular, single purposed application related functions, at least one of the tasks further ordering a non-application related function selected from a plurality of functions in a general function library.

11. The method of claim 10, further comprising validating each of the tasks subsequent to definition.

12. The method of claim 9, wherein defining a plurality of tasks comprises defining a plurality of tasks to conform to a uniform base interface, each task ordering a selection of granular, single purposed application related functions.

13. A computer program product comprising a computer readable medium having computer usable program code for test case assembly for testing an application, the computer program product including:
    computer usable program code for defining by a task generator based upon user specified parameters, a plurality of tasks, each task ordering a selection of granular, single purposed application related functions, the defined tasks conforming to a common interface for test scenarios in a tasks layer and scenario layer of a test automation framework;
    computer usable program code for further defining a plurality of test scenarios, each scenario ordering a selection of the defined tasks in a test flow;
    computer usable program code for selecting at least one of the defined test scenarios in a test case;
    computer usable program code for storing the test case in a library of test cases each test case including an ordered arrangement of one or more scenarios and supplemental test data; and,
    computer usable program code for providing the test case to a test automation controller for testing the application in a target testing environment.

14. The computer program product of claim 13, wherein the computer usable program code for defining a plurality of tasks comprises computer usable program code for defining a plurality of tasks, each task ordering a selection of granular, single purposed application related functions, at least one of the tasks further ordering a non-application related function selected from a plurality of functions in a general function library.

15. The computer program product of claim 14, further comprising computer usable program code for validating each of the tasks subsequent to definition.

16. The computer program product of claim 13, wherein the computer usable program code for defining a plurality of tasks comprises computer usable program code for defining a plurality of tasks to conform to a uniform base interface, each task ordering a selection of granular, single purposed application related functions.

17. An on demand test case assembly servicing method for managing different application tests in an on demand environment, the method comprising:
    receiving a first request to define a test case for an application test for an identifiable user as part of a transaction to test an application;

responsive to receiving the first request, defining by a task generator based upon user specified parameters, a plurality of tasks, each task ordering a selection of granular, single purposed application related functions, the defined tasks conforming to a common interface for test scenarios in a tasks layer and scenario layer of a test automation framework, further defining a plurality of test scenarios, each scenario ordering a selection of the defined tasks in a test flow, and selecting at least one of the defined test scenarios in a test case;

storing the test case in a library of test cases each test case including an ordered arrangement of one or more scenarios and supplemental test data;

receiving a second request to execute the test case as part of the transaction; and, responsive to receiving the second request, providing the test case to a test automation controller for testing the application in a target testing environment.

18. The servicing method of claim 17, further comprising assessing a fee to the identifiable user for the transaction.

* * * * *